Jan. 23, 1934.  A. O. BUCKIUS  1,944,705
ROLLER BEARING JOURNAL BOX
Filed Jan. 8, 1930  2 Sheets-Sheet 1
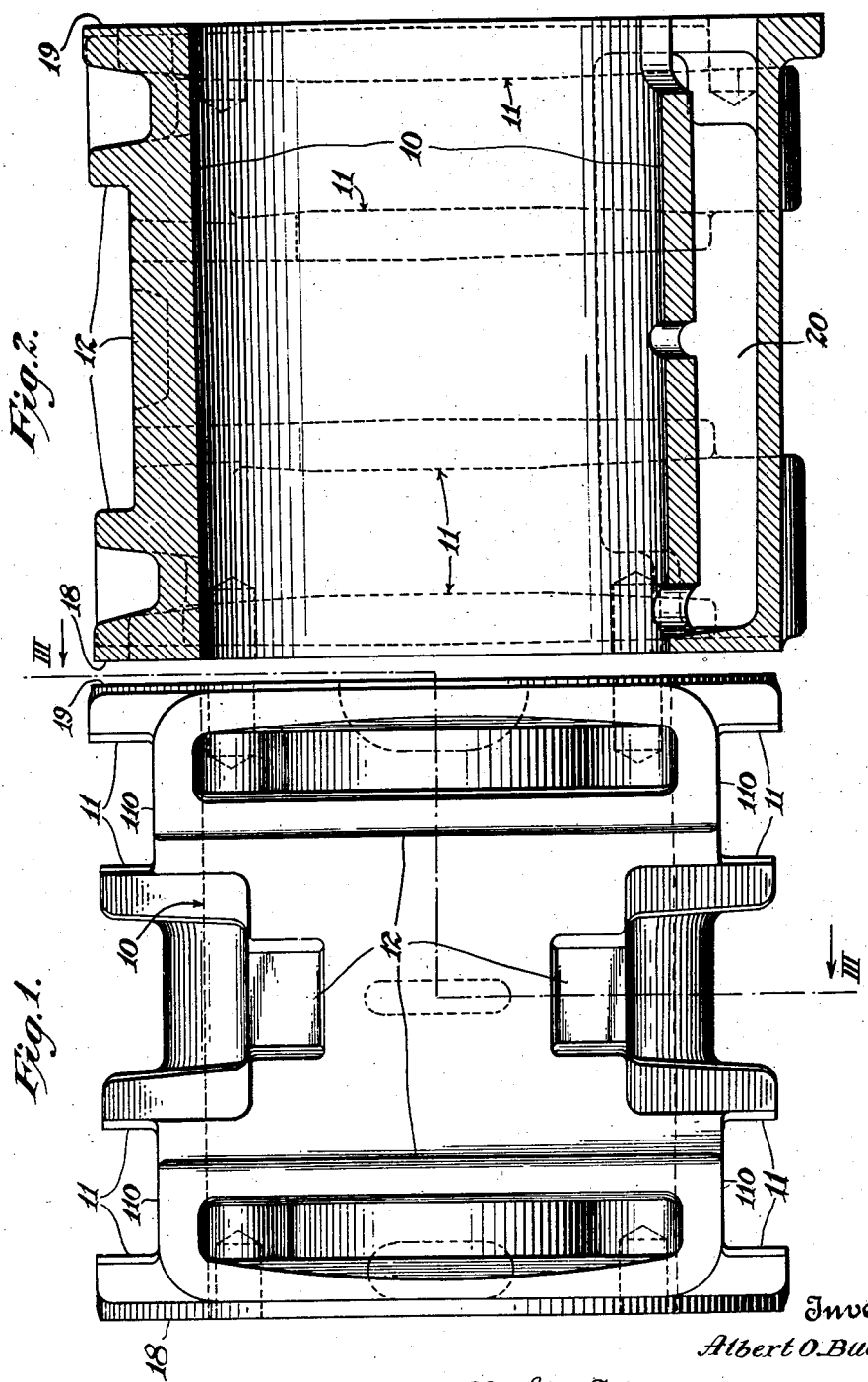
Inventor
Albert O. Buckius
By his Attorney
Clarence B Kerr Jan. 23, 1934.  A. O. BUCKIUS  1,944,705
ROLLER BEARING JOURNAL BOX
Filed Jan. 8, 1930  2 Sheets-Sheet 2
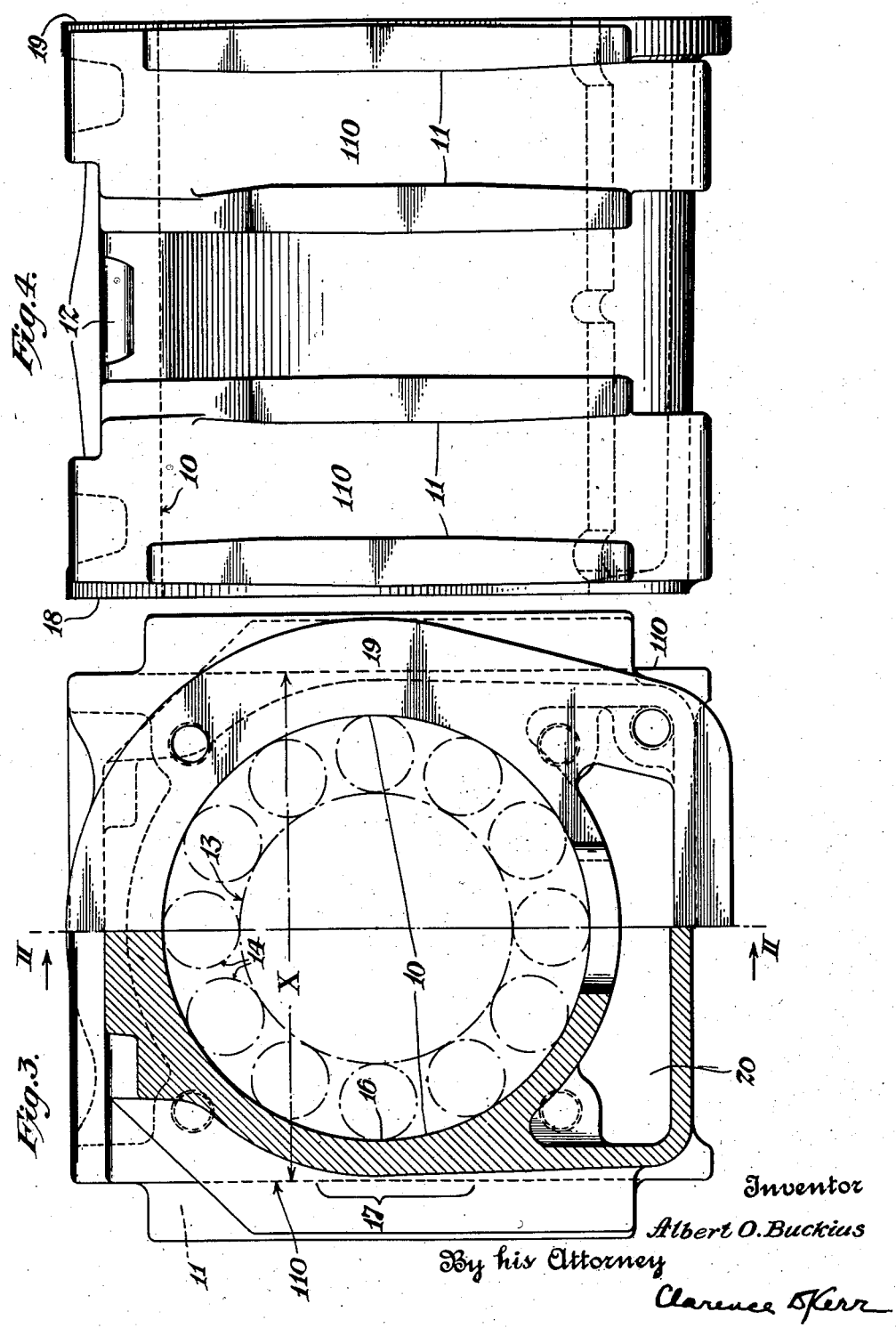

Patented Jan. 23, 1934

1,944,705

UNITED STATES PATENT OFFICE 1,944,705

ROLLER BEARING JOURNAL BOX

Albert O. Buckius, Cleveland, Ohio, assignor to National Malleable and Steel Castings Company, Cleveland, Ohio, a corporation of Ohio Application January 8, 1930. Serial No. 419,251

3 Claims. (Cl. 308—180)

The invention relates to the form and construction of journal boxes of the roller bearing type suitable for use in connection with railway cars, particularly of the class employed for passenger service. Journal boxes of this sort must, on the one hand, be provided with hard, wear-resisting surfaces at a number of selected points in order that they may withstand the excessive wear to which they are subjected from the large frictional forces encountered. At the same time it is necessary that these boxes shall be formed on the whole of material which is sufficiently ductile to withstand the heavy jars and vibrations which are encountered in the normal use of railway cars.

The principal wear-receiving surfaces which have in the past been protected by liners, or similar means, formed of wear-resisting material are the main inner bore of the journal box which constitutes the raceway for the rollers of the bearing construction; the outer guide surfaces at the sides of the box which co-operate with the pedestals or supporting members of the truck on which the journal box may be mounted; and the exterior surface at the top of the box which co-operates with the truck equalizer mechanism. In the past it has been the common custom to provide these three principal wear-receiving surfaces with separate liners, or the like, formed of material adapted to withstand the excessive wear; for example, a sleeve or bushing formed of suitable material, such as hard steel, has been pressed into the central bore of the box to serve as the raceway for the rollers of the bearing. In order to provide proper strength, this sleeve or bushing has had to be formed of material having a thickness of at least three eighths of an inch and it preferably should be more. The wear between the pedestals of the truck and the guide members of the journal box has in the past been taken care of by the use of lining members formed of hard, wear-resisting material welded, riveted, or shrunk onto the outsides of the box at the appropriate points. For the purpose of taking the brunt of the wear at the top of the box due to the action of the equalizer devices, a cap formed of suitable wear-resisting material has been provided at this point. On account of the small amount of space allowable for the insertion of caps of this sort, the metal has of necessity been so thin that frequent breakages of these caps have occurred, necessitating frequent replacements and repairs.

Provision of the extra hard, wear-resisting surfaces at the points indicated has involved considerable expense and at the same time has brought about certain seriously objectionable features in the construction. Wheel trucks employed in the building of passenger cars for railroads have become standardized to the point that the pedestals of such trucks adapted for the common size of journal, are spaced at a given distance apart, although they may be provided in somewhat different shapes. The standard distance between these pedestals co-operating with the opposite sides of a single journal box in the sizes most commonly used is nine inches. This means that within this relatively small dimension it has been necessary heretofore to provide in the customary construction the following elements; the wheel journal or axle, whose diameter is fixed as determined by considerations of the strength of the material and the forces to which it is subjected; the usual hardened roller raceway that is pressed on the axle; the rollers co-operating with the journal; the bushing or sleeve constituting the roller raceway; the walls of the box itself at diametrically opposite sides of the journal or axle; and the two pedestal guide liners provided on the opposite sides of the box. When all of these items are taken into consideration and proper allowance is made for the thickness of the parts to provide ample strength and all are confined within the nine-inch dimension allowable, it will be apparent that very little space is available between the circumference of the journal and the roller raceway for the provision of rollers of adequate size. In fact it has been necessary in the past to employ rollers in constructions of this sort which are of such small diameter as to be extremely inefficient in operation. Furthermore, it has been difficult to obtain rollers of this sort which will withstand the severe conditions of service to which they have been subjected.

One of the principal objects of the present invention has been to provide a journal box, adapted for use in the standard forms of roller bearing passenger car trucks, having the desired ductility and strength in the main body of the box, and being provided with hard-wearing surfaces at the points where it is most essential and at the same time having an efficiency of operation which is substantially better than has heretofore been obtainable. This purpose has been accomplished by certain features of the present invention, which make it possible to employ rollers in the bearing which are of adequate size to a materially stronger structure having an ample factor of safety.

A primary feature of the invention, which has rendered possible the attainment of the foregoing results, is the provision of integral case-hardened surfaces or more particularly carburized and hardened surfaces at the points of the box which are subjected to the main wear. In this connection it has been an important phase of the invention to provide these integral hardened surfaces without unduly weakening the main body of the box in its resistance to the jars and vibrations encountered under actual service conditions. A still further object of the invention has been to improve the methods of manufacture of journal boxes of the general character mentioned so as to provide proper ductility of the metal throughout the box as a whole and particularly at selected points and to provide hard, wear-resisting material at the points subjected to the greatest wear.

Other objects and advantages of the invention will be made apparent from the detailed description of one admirable form which the box may asume and one suitable mode of manufacturing the box to provide the hardened, wear-resisting surfaces at the proper points, which will now be given in conjunction with the accompanying drawings in which:

Figure 1 is a plan view of the journal box.

Figure 2 is a sectional elevational view of the box taken along the line II—II of Figure 3.

Figure 3 is an elevational view taken partly in section along the line III—III of Figure 1 and partly from the front of the box, and Figure 4 is a side elevation of the box.

Referring now to the drawings, the finished box may be provided with a large central opening 10 extending from front to rear through the entire length of the box to accommodate the wheel axle or journal and the rollers constituting a part of the bearing. The inner surface of the wall of the box surrounding the opening 10, which constitutes in itself the raceway for the rollers, is hardened to resist the wear to which it is subjected. The method of providing this hardened surface integral with the main body of the box casting will be explained hereinafter.

On the sides of the box casting, as best shown in Figures 1 and 4, there is provided one or more guideways 11, two on each side being shown, for co-operation with the pedestals of the truck to which the journal box is to be attached. These guideways are subjected to considerable wear due to the relative movement between the pedestals and the journal box in the regular course of operation. By a method which will be subsequently explained, all of the inner guiding surfaces designated 11 and 110 of these guideways are also hardened to provide the desired wear-resisting qualities without the necessity of inserting a separate liner for this purpose and without destroying the ductility of the main wall of the box. The surfaces designated 12, which are best shown in figures 1 and 4, are adapted to co-operate with the equalizer bars of the truck equalizing mechanism. In the normal course of service of a passenger car, the equalizing bars will partake of a movement relative to the co-operating surfaces of the journal box and will subject the latter to considerable wearing forces. It is accordingly essential that these surfaces be protected against excessive wear by proper hardening, in a way to be later explained.

Referring now to Figure 3, and bearing in mind the fact that the distance between the two opposite surfaces 110 taken along a horizontal line across the mid-point of the box and indicated as X is fixed by the standardized distance between a pair of co-operating pedestals, and bearing in mind that the wall thickness of the journal box cannot be reduced below a certain minimum required by considerations of strength, it will be apparent that the provision of liners for the guide surfaces 11 would cause an encroachment upon the main bore or central opening 10. Assuming, for example, that where a separate liner is employed on the surfaces 11 and 110, it must have a minimum thickness of one-eighth inch. Allowance for this amount must be made on both sides of the box and it must be deducted from the overall nine inch dimension so that it will be necessary to reduce the diameter of the opening 10 by at least a quarter of an inch. Now, assuming further that the wall surface of the box surrounding the opening 10 were of the ordinary cast steel or semi-steel construction, not capable of withstanding the excessive wear of the rollers, it would be necessary to further reduce the diameter of the opening 10 by double the wall thickness of a suitable bushing or sleeve inserted to serve as the raceway for the rollers. Since the requirements of strength would necessitate in such a case the use of a bushing having a wall thickness of at least ⅜", the diameter of the opening 10 available for the insertion of the axle 13, with its usual hardened roller raceway, and of the rollers 14 would be reduced at least ¾". It will be apparent that after subtracting ¼" for the two pedestal liners, ½" for the wall thickness, and ¾" for the roller raceway from the diameter of the opening 10, there will be little room left between the circumference of the axle 13 and the wall surrounding the opening 10 and it will not permit the insertion of rollers of desirable size. This is precisely the condition encountered in constructions heretofore employed. If we assume, by way of example, that the use of integral, hardened, wear-resisting surfaces of a 5½"x10" journal box allows an opening of, say, 8¼" for the main bore, only 7½" would be available where separate liners are employed. If, now, the axle must have a diameter of 5⅛" for proper strength and add ¾" for the hardened axle raceway, the rollers of the older types of construction must be limited to a diameter of ⅛" whereas the present invention enables the use of rollers of a diameter of 1³⁄₁₆".

According to the present invention is it proposed to provide wear-resisting surfaces at the points 10, 11 and 12 by a method of carburizing and hardening. It is, of course, well known that by proper methods, carbon may be made to penetrate the surfaces of a steel or iron body to a desired depth and this surface when properly heat-treated will then constitute an excellent wear-resisting surface. By any of the well known methods of case-hardening, and particularly carburizing and hardening, the interior surface of the journal box surrounding the opening 10 and the surfaces 11 and 110 forming the pedestal guides, as well as the surfaces 12 co-operating with the truck equalizer devices, may be rendered capable of withstanding the wear to which these surfaces are subjected. Furthermore, the main wear between the pedestals of the truck and the guideway of the journal box will naturally fall at the upper and lower portions of the surfaces 11 and 110 due to tipping of the box during use and a comparatively slight amount of wear will be encountered at the mid-portion of the guideway. Since the wear over the mid-portion of these surfaces is comparatively slight, it is possible to do away with the hardening of the middle section of the guideway, indicated generally by the bracket 17 in Figure 3, so that the normal strength and ductility of the metal at the weakest point designated 16 are preserved.

With this brief explanation of the salient features of the journal box itself, I will now describe briefly my method of forming the box and particularly of providing carburized, case-hardened surfaces at the points indicated.

A casting formed preferably of steel, is first formed to present substantially the contour of the finished article. Some allowance of extra metal should be made, however, on the main wearing surfaces indicated and on the ends of the box for the necessary machining. For example, an extra thickness of metal should be provided around the main bore 10 of the box so that the diameter of this opening will be somewhat less than in the finished article. Similarly, extra metal to allow for machining should be provided on the surfaces 11, 110 and 12 and on the two end surfaces 18 and 19 of the box. All of these surfaces may be machined to smooth them off and reduce them to nearly, but not quite, the desired dimensions prior to the carburizing and case-hardening operation. The end surfaces of the box may, if desired, be machined accurately to dimension at this time and any other machining or drilling of surfaces not to be subsequently case-hardened may also be completed. However, part or all of the other surfaces mentioned, which are to be subjected to case-hardening, will be left with a small excess of metal and final machining or grinding of these surfaces will preferably be deferred until after the case-hardening operation. This is on account of the fact that it is impossible to prevent a certain amount of warping of these surfaces in the course of the hardening process.

After the casting has been partly machined in the way indicated, it may be prepared for the case-hardening operation in somewhat the following way:

A plastic form of carburizing material of any standard composition, which might be one composed largely of an active form of carbon intermixed with a suitable form of binder to render it plastic, may be applied to form a coating of suitable depth on those portions of the outer surface of the casting to be hardened. This may include either the entire surfaces 11 and 110, cooperating with the pedestals, or it may exclude the central portion 17 of these guideways, as previously indicated. If desired, those portions of the surface of the casting which are not to be hardened may be coated with some suitable form of paint which is free from carburizing agents and which will prevent the penetration of the carburizing constituents applied to other parts and possibly carried to a certain extent in the surrounding atmosphere. However, it has been found that the action of the carburizing paste is so localized to the portions of the surface to which it is actually applied that no protective coating of paint is normally required even on contiguous surfaces. This is particularly true where the article is not confined during the treatment within a small enclosing housing or carburizing pot.

When the plastic carburizing material has been applied to all of the exterior surfaces to be hardened, the casting is placed on a plate or in a carburizing pot, which is preferably completely enclosed. The main bore 10 of the box is then preferably filled with a coarse, granular form of carburizing material and a short pipe section of substantially the same diameter as the bore is placed above the latter and also filled with this granular carburizing material. The purpose of this pipe is to provide a reservoir for additional material to descend into the bore of the casting during the treating operation. There is a tendency for the carburizing material to shrink in the course of the reaction so that if this extra quantity were not supplied there would be danger of neglecting the surface at the upper end of the bore and not giving it an opportunity to absorb as much carbon as the surface of the rest of the bore and an uneven carbon case would result. In lieu of employing the granular type of carburizing material within the bore, the latter may be coated with the same paste-like material applied to the outer surfaces of the casting, if desired.

The carburizing pot now containing the casting, prepared in the way indicated, is introduced into a suitable furnace, which may to advantage be an electric type of furnace, and it is therein subjected to a heat treatment at a temperature suitable for the carburizing or casing reaction. This treatment may be continued for any suitable period of time, preferably between 30 and 60 hours, depending upon the degree of penetration of the carbon desired. After a period of about 48 hours the carbon should have penetrated to the extent of about one-eighth of an inch. After the carburizing reaction has been carried to the desired extent, the casting is removed from the furnace and the granular and pasty forms of carburizing material are removed from the casting. The latter may then either be quenched suddenly in a bath of relatively cold water or oil, or the casting may be allowed to cool and be subsequently reheated above the critical temperature of the carbon case and then quenched in either water or oil, or similar medium, or in any other suitable way. This final heat treatment of subjecting the cased or carburized surfaces to a temperature above the critical point and then suddenly cooling them serves to produce the hard, wear-resisting surfaces at the selected points.

In view of the fact that it is extremely important to provide the bore of the box with as hard a surface as possible, special means may be provided for more suddenly quenching this portion of the casting than the method previously explained. A harder surface will be produced by a very sudden quenching of this surface than by the quenching brought about by plunging the device into a bath of water or oil. To accomplish the desired sudden quenching, a plurality of streams of cold water may be jetted against all parts of the surface surrounding the bore in any suitable way so as to provide a continuously changing layer of cold water over the surface to be chilled. The hardened surfaces on the exterior of the box may advantageously be chilled somewhat more gradually either by directing streams of water with less velocity and force against these surfaces or by plunging the box into a body of water or oil, as first explained. This will serve to lessen the destruction of the ductile qualities of the steel as compared with the results of the sudden chilling applied to the bore.

When the carburizing material is omitted altogether from the portion 17 of the pedestal guide, the thinnest wall of the journal box located at the point 16 will retain the greater portion of its original strength and ductility.

After the various hardened surfaces have been properly carburized such of them as desired should be further machined or ground to the exact dimensions desired. In the course of this additional machining or grinding any unevenness in the surfaces which may have developed as a result of warping during the carburizing operation may be completely eliminated. This is particularly essential in connection with the surface around the central bore. Other machine work if not performed at an earlier stage may be done at this time.

The box is now finished and ready for application to a car truck. It will be understood, of course, that the original casting from which the box is made will be provided with various other adjuncts, not described but forming a part of most standard journal boxes. For example, suitable provisions may be made for the insertion of bolts to secure a cover or closure to the end of the box. Proper lubrication of the roller bearing may be effected in any suitable way, as by the provision of an oil reservoir 20 below the central bore and if desired this may be supplemented by the use of a wick and it may be enclosed by a separable oil-retaining plate such as disclosed in applicant's co-pending application, Ser. No. 332,346, filed January 14, 1929.

While in the foregoing description certain details of construction have been specified and certain details of the preferred method of producing a journal box having integral hard, wear-resisting surfaces have been enumerated, many variations in the construction and mode of procedure may be adopted without departing from the general spirit and scope of the invention. One of the principal contributions of the present invention is the provision of a journal box which may be used in the normal standardized passenger truck constructions and which is adapted for the use of much larger rollers in the bearings than has heretofore been possible. This result has been accomplished, furthermore, without in any way sacrificing the strength of the box and its resistance to the usual jars and vibrations.

What I claim as my invention is:

1. A roller bearing journal box comprising a casting formed substantially entirely of normally ductile material, having a central bore extending therethrough, a roller raceway surrounding said bore, said raceway being formed integral with said casting and pedestal guideways formed integral with said casting on opposite sides of the bore, said raceway and only those portions of the faces of said guideways not directly opposite said bore being provided with integral wear-resistant surfaces of higher carbon content than the main body of the box.

2. A journal box adapted to be slidably mounted in a frame comprising a casting having a main longitudinal bore therethrough and a plurality of substantially vertical pedestal guideways on opposite sides of said bore, said guideways having bearing faces spaced a definite limited distance apart, the bearing surface surrounding said bore and the faces of said guideways being integral with the casting, said surface and only the upper and lower portions of said faces having a higher carbon content than the main portion of said casting and being hardened, no section of the metal surrounding said bore being hardened through.

3. A journal box comprising a casting having a main longitudinal bore and a plurality of substantially vertical pedestal guideways on opposite sides of said bore, the faces of said guideways and bore having therebetween at certain zones relatively thin sections of metal, the entire surface of said bore and only those portions of said guideways removed from said thin sections being hardened, whereby a completely hardened section of metal around any portion of said bore is avoided.

ALBERT O. BUCKIUS.